(12) United States Patent
Kerin et al.

(10) Patent No.: US 7,731,245 B2
(45) Date of Patent: Jun. 8, 2010

(54) QUICK CONNECTOR COUPLING

(75) Inventors: Jim Kerin, Grosse Pointe Woods, MI (US); Richard M. Pepe, Macomb, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 763 days.

(21) Appl. No.: 11/544,702

(22) Filed: Oct. 6, 2006

(65) Prior Publication Data

US 2008/0084064 A1   Apr. 10, 2008

(51) Int. Cl.
*F16L 33/16* (2006.01)
(52) U.S. Cl. .............................. 285/319; 285/82; 285/93
(58) Field of Classification Search ................... 285/93, 285/319, 82, 305
See application file for complete search history.

(56) References Cited

U.S. PATENT DOCUMENTS

| 4,146,254 | A |   | 3/1979  | Turner et al. |             |
|-----------|---|---|---------|---------------|-------------|
| 4,722,560 | A |   | 2/1988  | Guest         |             |
| 4,925,217 | A |   | 5/1990  | Ketcham       |             |
| 4,948,176 | A |   | 8/1990  | Bartholomew   |             |
| 5,161,834 | A | * | 11/1992 | Norkey        | 285/319     |
| 5,171,028 | A | * | 12/1992 | Bartholomew   | 277/619     |
| 5,195,787 | A | * | 3/1993  | Bartholomew   | 285/319     |
| 5,228,728 | A | * | 7/1993  | McNaughton et al. | 285/319 |
| 5,257,833 | A |   | 11/1993 | McNaughton et al. |         |
| 5,261,709 | A |   | 11/1993 | McNaughton et al. |         |
| 5,354,102 | A | * | 10/1994 | Carman        | 285/81      |
| 5,441,313 | A |   | 8/1995  | Kalahasthy    |             |
| 5,462,313 | A |   | 10/1995 | Rea et al.    |             |

(Continued)

FOREIGN PATENT DOCUMENTS

DE       10318601 A1      11/2004

(Continued)

OTHER PUBLICATIONS

Land, "ReibschweiBen nach dem Rotations—und Vibrationsverfahren," *Plast-Verarbeiter*, 34(8): 698-699 (Aug. 1983).

*Primary Examiner*—David E Bochna
(74) *Attorney, Agent, or Firm*—Leydig, Voit & Mayer, Ltd.

(57) ABSTRACT

A quick connector coupling comprising a connector body, a primary retainer, a secondary retainer and a male member having a radially enlarged upset. The connector body includes a stem and a separate cap permanently secured to the stem. The stem defines an axially extending through bore and includes an annular rib located radially outward of the bore. The cap defines an annular groove located radially outward of the bore. The annular rib of the stem is positioned in the annular groove of the cap. The cap is spin welded to the stem to permanently secure the cap to the stem. The connector body further defines two annular abutment surfaces. The primary retainer and the secondary retainer are located axially in between the two annular abutment surfaces of the connector body. The primary retainer has a ring and two primary retainer arm located axially forward of the ring. Each primary retainer arm is in abutting relationship with the upset. The secondary retainer has a ring and two secondary retainer arms located axially rearward of the ring. Each secondary retainer arm is located circumferentially in between two primary retainer arms and in abutting relationship with the upset.

18 Claims, 6 Drawing Sheets

U.S. PATENT DOCUMENTS

| | | | |
|---|---|---|---|
| 5,485,982 A * | 1/1996 | Gunderson | 251/149.6 |
| 5,586,792 A | 12/1996 | Kalahasthy et al. | |
| 5,626,371 A | 5/1997 | Bartholomew | |
| 5,628,531 A | 5/1997 | Rosenberg et al. | |
| 5,700,040 A | 12/1997 | Kujawski | |
| 5,725,257 A * | 3/1998 | Sakane et al. | 285/81 |
| 5,779,278 A * | 7/1998 | Grooters et al. | 285/93 |
| 5,779,279 A | 7/1998 | Bartholomew | |
| 5,897,145 A | 4/1999 | Kondo et al. | |
| 5,924,746 A * | 7/1999 | Fixemer | 285/93 |
| 6,199,916 B1 | 3/2001 | Klinger et al. | |
| 6,312,020 B1 | 11/2001 | Ketcham et al. | |
| 6,318,764 B1 * | 11/2001 | Trede et al. | 285/305 |
| 6,340,180 B1 * | 1/2002 | Wisniewski | 285/319 |
| 6,343,814 B1 * | 2/2002 | Bucher et al. | 285/319 |
| 6,371,529 B1 * | 4/2002 | Szabo et al. | 285/319 |
| 6,517,120 B1 * | 2/2003 | Miyajima et al. | 285/305 |
| 6,832,785 B1 | 12/2004 | Zitkovic, Jr. | |
| 7,434,846 B2 * | 10/2008 | Baumgartner | 285/319 |
| 7,455,330 B2 * | 11/2008 | Baumgartner, Hans | 285/340 |
| 2004/0021318 A1 | 2/2004 | Fritze et al. | |
| 2004/0066034 A1 | 4/2004 | Takayanagi et al. | |
| 2005/0127668 A1 | 6/2005 | Mobley et al. | |
| 2006/0103134 A1 | 5/2006 | Kerin | |
| 2006/0175832 A1 | 8/2006 | Mueller et al. | |

FOREIGN PATENT DOCUMENTS

| | | |
|---|---|---|
| DE | 202005002159 U1 | 9/2005 |
| EP | 0846907 A2 | 6/1998 |
| EP | 1 503 128 A2 | 2/2005 |

* cited by examiner

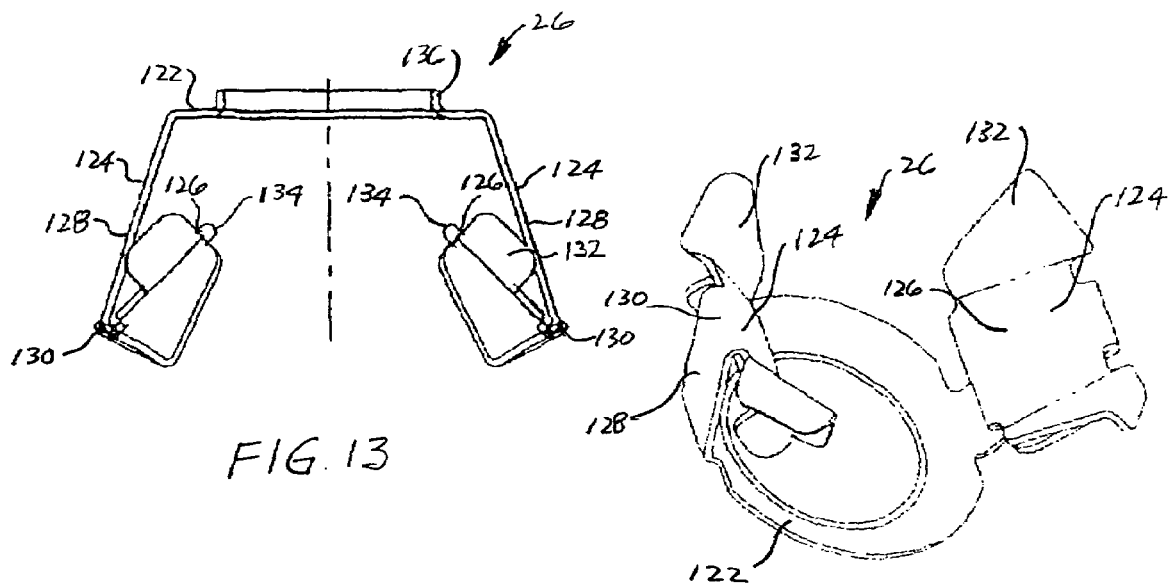
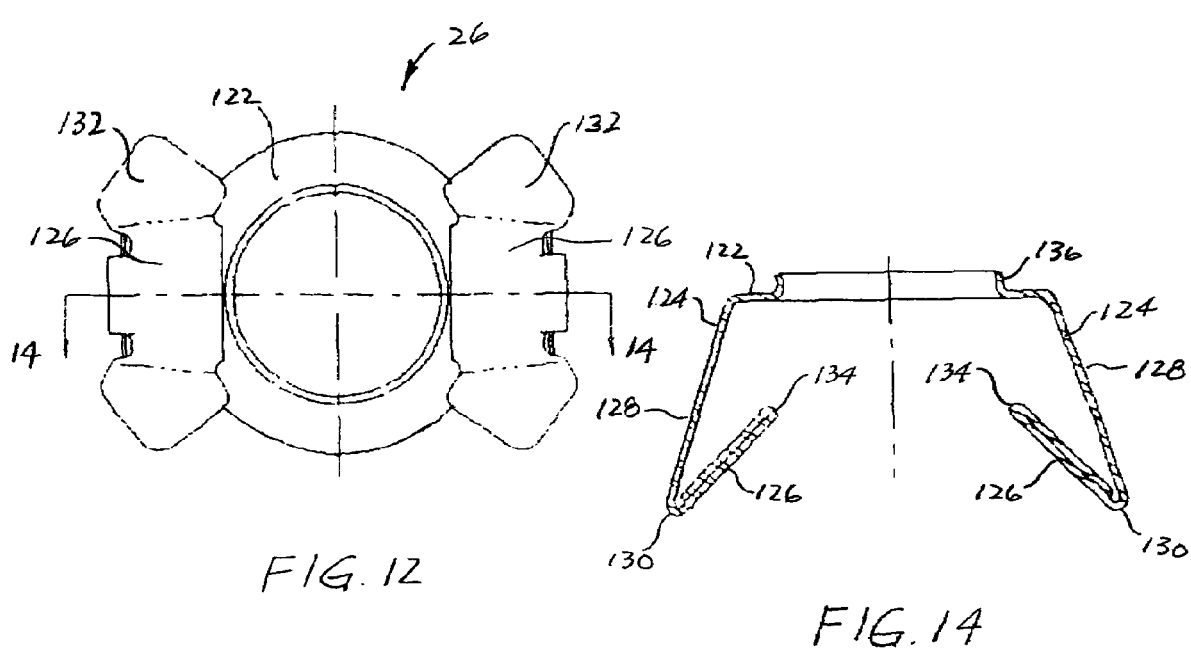

QUICK CONNECTOR COUPLING

BACKGROUND OF THE INVENTION

This invention relates to fluid line systems which include quick connector couplings. In particular, it relates to a quick connector coupling having a connector body and a retainer having arms which flex radially outward to allow a radially enlarge upset of a tube to pass through the arms.

In automotive and other fields, quick connector couplings, which generally include a male member received and sealingly retained in a single piece plastic or metal female connector body are often utilized to provide a fluid connection between two components or conduits, thus establishing a fluid line between the two components or conduits. Use of quick connector couplings is advantageous in that a sealed and secured fluid line may be established with a minimum amount of time and expense.

A number of methods and mechanisms exist for securing the male member and the female connector body of a quick connector coupling together. One type of retention mechanism involves use of a metal retainer having arms which flex radially outward to allow a radially enlarged upset of a tube to pass through the arms. The arms flex or snap radially inward once the upset portion of the tube passes them and abut the upset portion, preventing tube removal. An example of this type of metal retainer is found in commonly assigned U.S. Pat. No. 5,257,833 to McNaughton et al., which is incorporated herein by reference.

The quick connector coupling of the present invention provides the benefits of high heat application and crash resistance associated with a metal retainer while still provides the benefits of corrosion resistance and ease of manufacturing associated with an injection molded connector body. The quick connector coupling of the present invention further provides the benefit of two retainers, each capable of independently retaining the tube to connector body. The quick connector coupling of the present invention also provides the benefit of positioning a retainer in the bore of the connector body and in between two annular abutment surfaces without the need to insert the retainer through the entrance of the bore.

The present invention has application to myriad of quick connectors and is not limited to the particular quick connector coupling used for illustration.

BRIEF DESCRIPTION OF THE DRAWINGS

FIG. 11 is a perspective view of the primary retainer of the quick connector coupling assembly of FIG. 1.

FIG. 12 is a front view of the primary retainer of FIG. 11.

FIG. 13 is a top view of the primary retainer of FIG. 11.

FIG. 14 is a sectional top view of the primary retainer of FIG. 11, taken along line 14-14 of FIG. 12.

DETAILED DESCRIPTION OF THE ILLUSTRATED EMBODIMENTS

The quick connector coupling illustrating the present invention is shown in FIGS. 1-19. It is shown as a releasable connection between a rigid tube and other fluid carrying components, particularly a flexible hose. However, the coupling has numerous other applications where a fluid tight, but releasable connection is desired, such as connection of rigid elements of a fluid path, whether pressurized or unpressurized.

Figure 1:
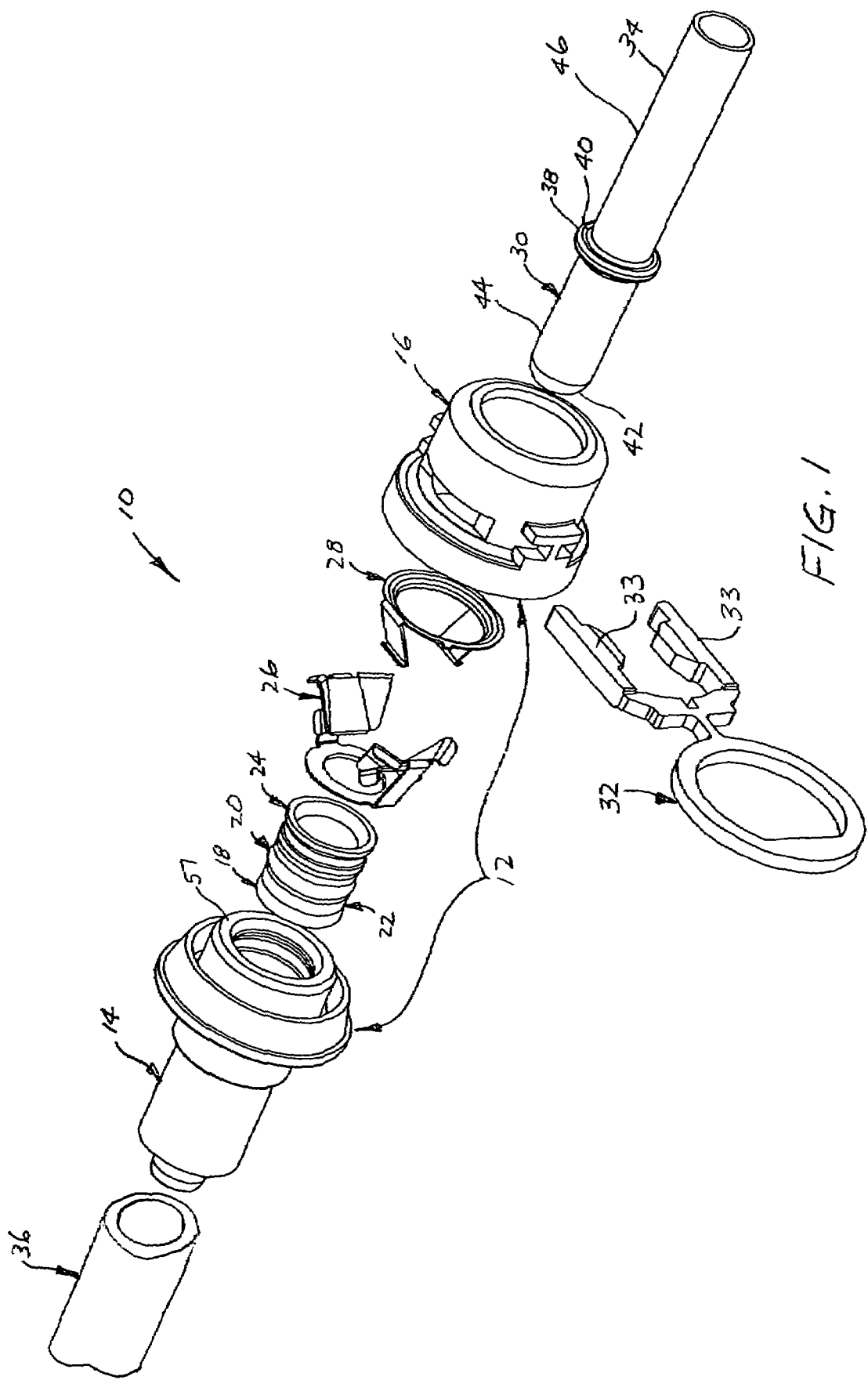
FIG. 1 is an exploded view of a quick connector coupling assembly embodying the features of the present invention.

FIG. 1 illustrates a quick connector coupling 10 for forming a severable connection in a fluid line. The coupling 10 is comprised of a connector body 12 having a stem 14 and a separate cap 16 permanently secured to the stem 14. The coupling 10 is further comprised of two O-ring seals 18 and 20 separated by a rigid spacer ring 22, a bushing 24, a primary retainer 26 and a secondary retainer 28. A male member 30 is releasably secured to the connector body 12 by the primary retainer 26 and the secondary retainer 28. It should be noted that "permanently secured" is used to describe two or more secured components not meant to be separated and cannot be easily separated without damaging the components, whereas, "releasably secured" is used to describe to two or more secured components which can be separated without damaging the components.

A pull tab verifier 32 having two legs 33 can be used to provide visual verification that the male member 30 has been properly secured to the connector body. Pull tab verifiers capable of providing visual verification that the male member has been properly secured to the connector body are known. Example of such a pull verifier is disclosed in commonly assigned U.S. application Ser. No. 11/440,753, which is incorporated herein by references.

The male member 30 is formed at an end of a hollow rigid tube 34 which forms a part of a fluid line system. In use, the stem 14 is connected to a flexible tubing or hose 36 which is also a part of the fluid line system. The connector body 12 and the male member 30 are connectable to form a permanent, but severable, joint in the fluid line. The male member 30 includes a radially enlarged upset 38 defining a radial abutment surface 40 at a given distance from an open tube end or tip 42. The tube end 42 can be rounded or tapered to make insertion of the male member 30 into connector body 12 less difficult. A smooth generally cylindrical sealing surface 44, defined by the exterior surface of the tube, extends between the upset 38 and the tube end 42. The tube continues in a direction away from the tube end beyond upset 38 and defines a generally smooth cylindrical surface 46. It is generally the same diameter as the cylindrical sealing surface 44.

Figure 2:
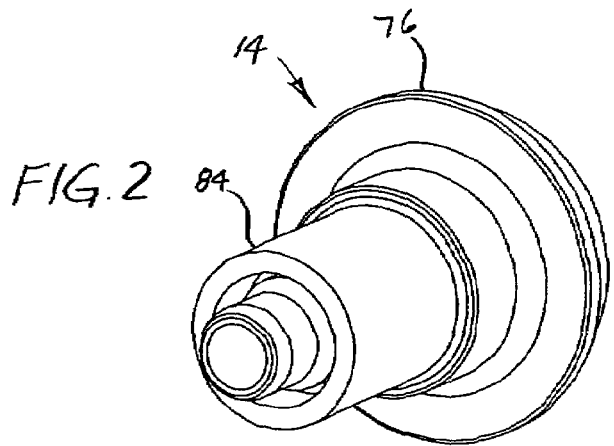
FIG. 2 is a perspective view of the cap of the quick connector coupling assembly of FIG. 1.
Figure 3:
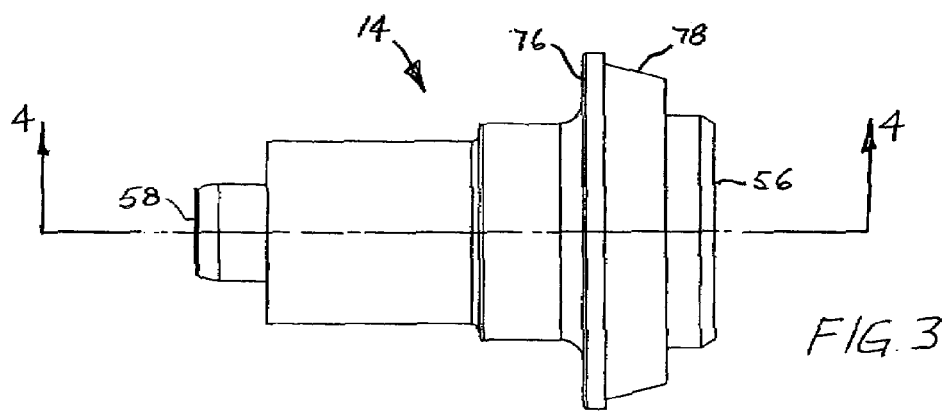
FIG. 3 is a top view of the stem of FIG. 2.
Figure 4:
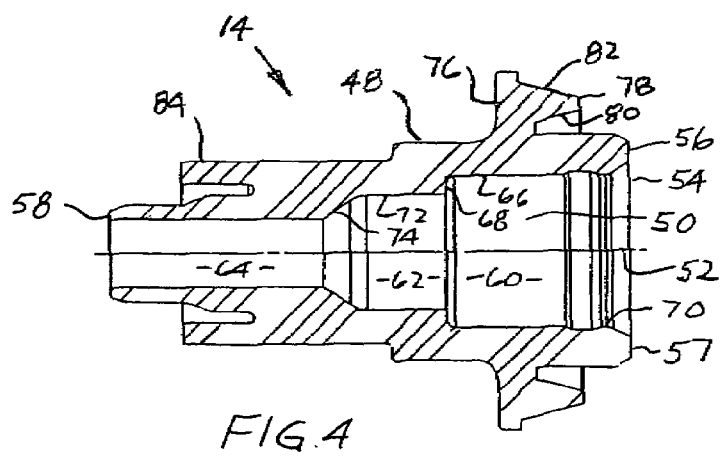
FIG. 4 sectional side view of the stem of FIG. 2, taken along line 4-4 of FIG. 3.

The stem 14 is illustrated in detail in FIGS. 2-4. The stem 14 is preferably made from an injection moldable, non-metallic, polymeric material. The stem 14 is more preferably made of a heat resistance plastic (conductive PPA thermoplastic). The stem 14 is defined by a generally cylindrical stepped wall 48. The interior surface of the wall 48 defines a through bore 50 centered about a longitudinal central axis 52, as illustrated in FIG. 4. It should be noted that the term axial and axially as used herein means longitudinally along the central axis 52. The terms radial or radially mean in direction perpendicular to the axis 52 toward and away from the axis.

The bore 50 of the stem 14 extends completely through the stem from an opening 54 at a cap connection end 56 of the stem 14 to a hose connection end 58. Variations in the inner diameter of wall 48 of stem 14, defining the bore 50, divide the bore into distinction portions. Moving rearward from the cap connection end 56 to the hose connection end 58, they are: seal chamber portion 60, tube end receptacle portion 62, and fluid passageway portion 64. The stem further defines a forward facing annular surface 57 at the cap connection end 56. The annular abutment surface 57 of the stem is adapted to engage the primary retainer 26 to limit axially rearward movement of primary retainer relative to the connector body 12. It should be noted that the term rearward is used herein to mean in a direction axially from cap connection end 56 toward the hose connection end 58 generally along the central axis 52. The term forward means in a direction axially from the hose connection end 58 toward the cap connection end 56 generally along the central axis 52.

The seal chamber portion 60 is defined by a cylindrical sealing surface 66 terminating at a radial shoulder 68. A ridge 70, located axially between the cylindrical sealing surface 66 and the opening 54, retains the bushing 24 within the seal chamber portion 60. The seal chamber portion 60 houses the O-rings 18 and 20. The O-rings 18 and 20 are retained axially in the seal chamber portion 60 by the bushing 24 at one end and the radial shoulder 68 at the other end.

The tube end receptacle portion 62 of the bore 50 is located axially rearward of the seal chamber portion 60. The tube end receptacle portion 62 is defined by a reduced diameter cylindrical tube reception surface 72, which extends axially rearward from the small diameter end of the radial shoulder 68 to a conical shoulder 74. The cylindrical tube end receptacle surface 72 is sized to receive, and pilot or guide the male member sealing surface 44.

The fluid passageway portion 64 is defined by the smallest diameter interior surface of wall 48. It leads from the small diameter end of conical shoulder 74 to the hose connection end 58.

Figure 5:
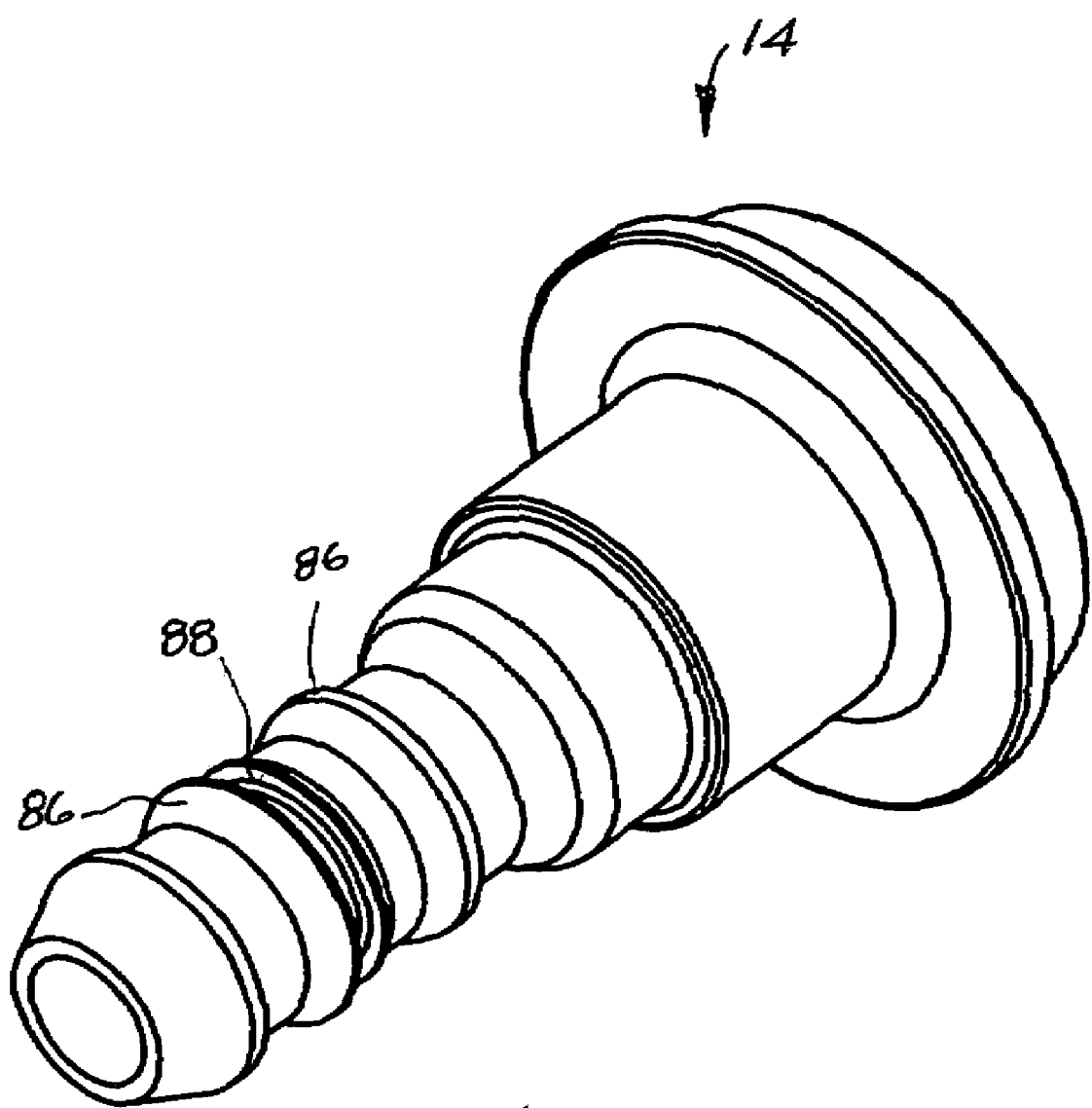
FIG. 5 is a perspective view of an alternative stem embodying the features of the present invention.
Figure 8:
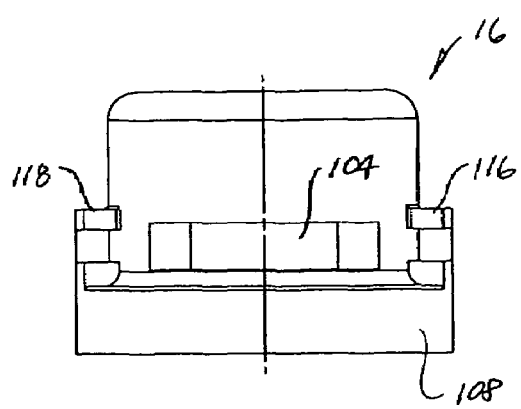
FIG. 8 is a top view of the cap of FIG. 6.
Figure 6:
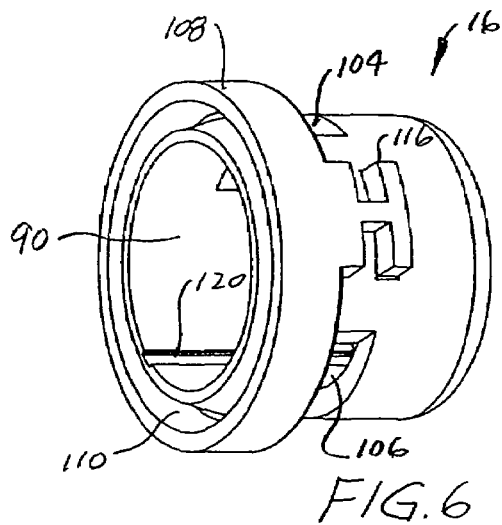
FIG. 6 is a perspective view of the cap of the quick connector coupling assembly of FIG. 1.
Figure 7:
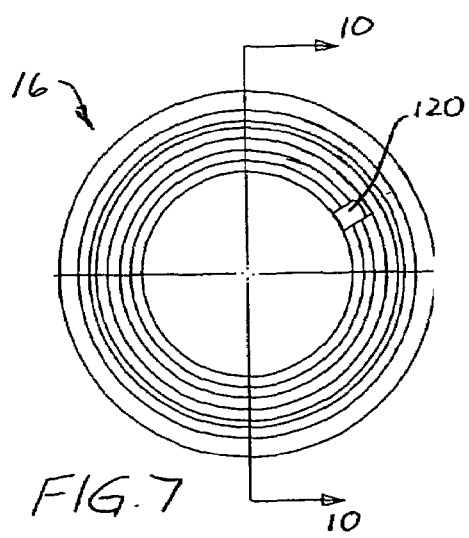
FIG. 7 is a rear view of the cap of FIG. 6.
Figure 9:
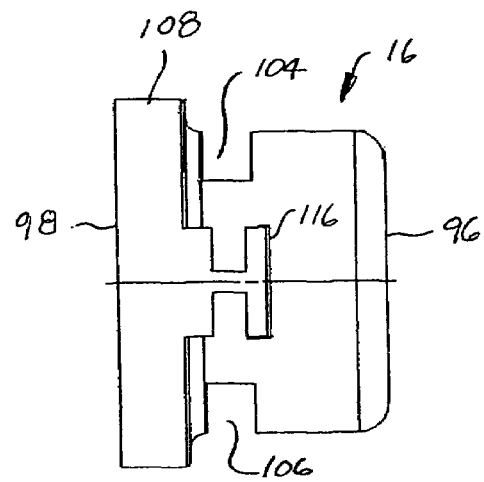
FIG. 9 is a side view of the cap of FIG. 6.
Figure 10:
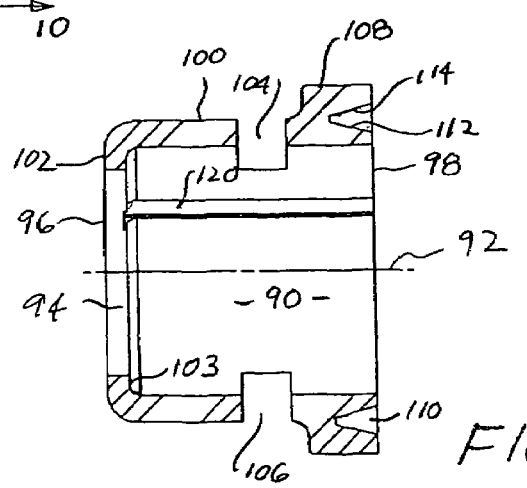
FIG. 10 is a sectional side view of the cap of FIG. 6, taken along line 10-10 of FIG. 7.
Figure 17:
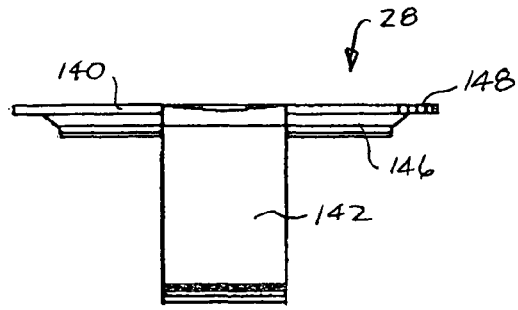
FIG. 17 is a top view of the secondary retainer of FIG. 15.
Figure 15:
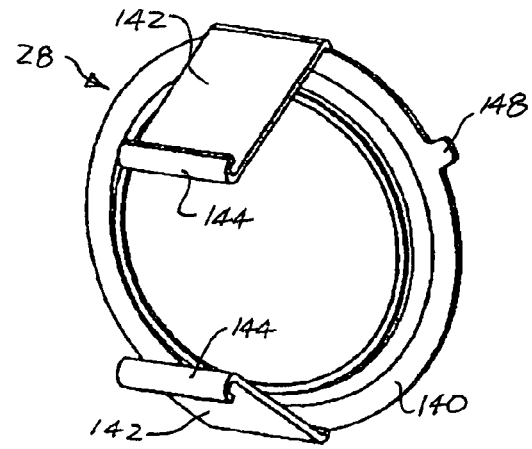
FIG. 15 is a perspective view of the secondary retainer of FIG. 1.
Figure 16:
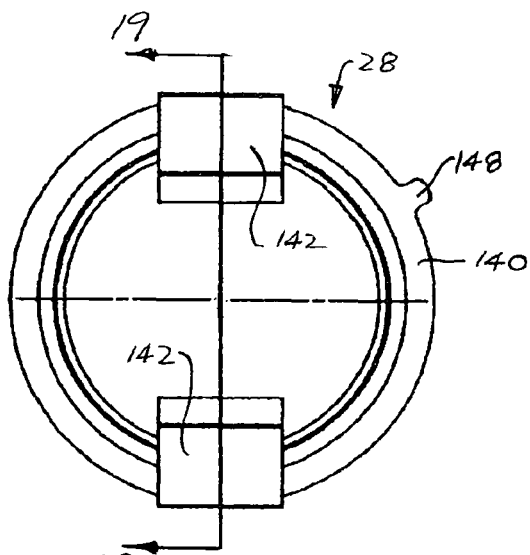
FIG. 16 is a rear view of the secondary retainer of FIG. 15.
Figure 18:
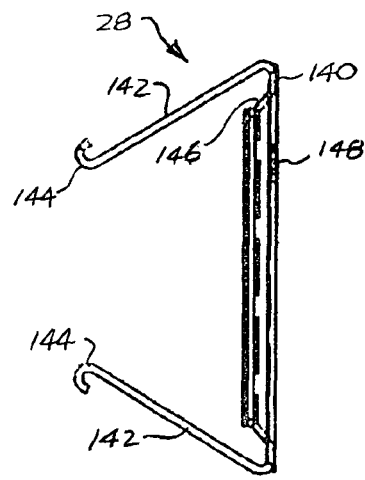
FIG. 18 is a side view of the secondary retainer of FIG. 15.
Figure 19:
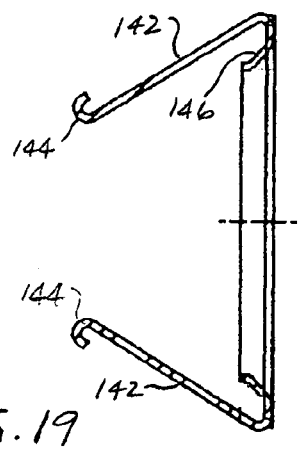
FIG. 19 is a sectional side view of the secondary retainer of FIG. 15, taken along line 19-19 of FIG. 16.

The exterior surface of the stem 14, near the cap connection end 56, includes a radially outwardly extending rim 76. An annular rib 78 extends axially forward from the front surface of the rim 76. The radially inner and outer surfaces 80 and 82 of the annular rib 78 are tapered to allow for a tight fit between the rib 78 and a corresponding groove defined in the cap 16. The exterior surface of the stem 14, near the hose connection end 58, is configured to facilitate connection to another component, such as the flexible hose 36, in the fluid line. The stem 14 illustrated in FIGS. 1-4, for example, is specially formed with a crimp collar 84 for securing the hose to the stem. The use of crimp collars to secure a flexible hose to the end of a connector body is known and disclosed in commonly assigned U.S. Pat. No. 6,312,020 to Ketcham et al., incorporated herein by reference. Alternatively, the stem 14 can formed with radial barbs 86 and a groove 88 to house an O-ring seal to seal against the interior of the hose, as illustrated in FIG. 5.

It must be understood that the stem 14 may take any desired shape without departing from the invention. It also does not need to be straight. For example, it could include a 45° or a 90° bend between its ends.

The cap 16 is illustrated in detail in FIGS. 6-10. The cap 16 is preferably made of a heat resistance plastic (conductive PPA thermoplastic). The stem 14 and the cap 16 are preferably made from the same material.

The cap 16 defines a through bore 90 centered about a longitudinal central axis 92. The bore 90 extends completely through the cap 16 from an entrance 94 at a tube reception end 96 of the cap to a stem connection end 98. The cap 16 includes a generally cylindrical wall 100. A lip 102 extends radially inward from the cylindrical wall 100 and defines the entrance 94. The lip 102 further defines a rearward facing annular abutment surface 103 directed away from the entrance 94 and towards the bore 90. The annular abutment surface 103 of the cap is adapted to engage the secondary retainer 28 to limit axially forward movement of the primary and secondary retainers 26 and 28 relative to the connector body 12.

A top slot 104 and a bottom slot 106 extend through the cylindrical wall 100 and are open to the bore 90. Located radially between the cylindrical wall 100 and the stem connection end 98 is a radially enlarged section 108. The radially enlarged section 108 defines an annular groove 110 extending forward from the stem connection end 98. The lower and the upper surfaces 112 and 114, defining the groove 110, are each angled at approximately the same angle as the corresponding angle of the radially inner and outer tapered surfaces 80 and 82 of rib 78. This allows the rib 78 to fit tightly within the groove 110. A pair of H-shaped protrusions 116 and 118 extend radially outward from the cylindrical wall 100 and axially forward from the radially enlarged section 108 at the sides of the cap 16. The H-shaped protrusions 116 and 118 receive and position the pull tab verifier 32. The cap 16 further defines an alignment slot 120 extending from the lip 102 to the stem connection end 98. The alignment slot 120 is adapted to receive an alignment tab of the secondary retainer 28.

It should be noted that for purpose of clarity, the quick connector coupling 10 is shown with its longitudinal extent positioned in a horizontal plane and the terms "top," "bottom" and "sides" have been used in describing the cap 16. It will become understood that the "top" and "bottom" configurations are associated with the slots 104 and 106; whereas, the "side" configurations are associated with the H-shaped protrusions 116 and 118. However, in use, the connector coupling 10 can reside in any orientation without regard to the horizontal and vertical planes and "top", "bottom" and "side" are only relevant to the illustration herein.

The primary retainer 26 is illustrated in detail in FIGS. 11-14 and is preferably made of a metallic material and more preferably from a stainless steel. The primary retainer 26 includes a generally non-flexible ring 122 and two circumferentially spaced arms 124 located axially forward of the ring 122. The outer diameter of the ring 122 is preferably greater than the diameter of the opening 54 of the stem 14. Each arm 124 includes a radially inner section 126 and a radially outer section 128. The radially outer sections 128 extend axially forward and radially outward from the ring 122. A rear bend 130 connects the radially inner section 126 with the radially outer section 128. Braces 132 extend circumferentially from each circumferential side of the radially inner sections 126 to provide additional strength against buckling of the primary retainer 26. The radially inner section 126 includes a ledge 134 adapted to abut the upset 38 of the male member 30. A cylindrical sleeve 136 extends axially rearward from the ring 122. The sleeve 136 provides guidance for the male member 30.

The secondary retainer 28 is illustrated in detail in FIGS. 15-19 and is preferably made of a metallic material and more preferably from a stainless steel. The secondary retainer 28 includes a generally non-flexible ring 140 and two circumferentially spaced arms 142 located axially rearward of the ring 140. The outer diameter of the ring 140 is preferably greater than the diameter of the entrance 94 of the cap 16. The arms 142 extend axially rearward and radially inward from the ring 140. Each arm 142 includes a ledge 144 adapted to abut the upset 38 of the male member 30. The ledge 144 is bent radially outward to allow for a great surface area for contacting the upset 38. A cylindrical sleeve 146 extends axially rearward from the ring 140. The sleeve 146 provides guidance for the male member 30. An alignment tab 148 extends radially outwardly from the ring 140. The alignment tab 148 is sized and positioned to allow it to slide along the alignment slot 120 defined in the cap 16. The alignment tab 148 of the secondary retainer 28, in conjunction with the alignment slot 120 of the cap 16, assures that the secondary retainer 28 is at its desired rotational position.

Prior to permanently securing the cap 16 to the stem 14; the O-rings 18 and 20 and the spacer ring 22 are inserted into the seal chamber portion 60 of the stem 14. With the O-rings 18 and 20 and the spacer 22 properly situated within the seal chamber portion 60 of the bore 50, the bushing 24 is then inserted into the seal chamber portion 60 until it engages the ridge 70 to secure the bushing 24 to the stem 14.

The primary retainer 26 and the secondary retainer 28 are then positioned in between the stem 14 and the lip 102 of the cap 16. The secondary retainer 28 is inserted into the bore 90 of the cap 16 by first aligning the alignment tab 148 with the alignment slot 120 of the cap 16. With the alignment tab 148 aligned with the alignment slot 120, the secondary retainer 28 is rotationally oriented such its arms 142 are at the top and bottom. The secondary retainer 28 is then slid axially forward in the bore 90 until the ring 140 of the secondary retainer 28 contacts the annular abutment surface 103 of the lip 102 of the cap 16. The primary retainer 26 is then inserted into the bore 90 of the cap 16 with its arms 124 directed forward and at a rotational orientation such that its arms 124 are at the sides and located circumferentially between the arms 142 of the secondary retainer 28. The primary retainer 26 is inserted into the bore 90 of the cap 16 until the rear bend 130 of each arm 124 contacts the ring 140 of the secondary retainer 28. It should be noted that in their inserted positions, the arms 142 of the secondary retainer 28 are at the top and bottom and the arms 124 of the primary retainer 26 are at the sides. This rotational arrangement of the arms 124 and 142 allows the legs 33 of the pull tab verifier 24 to have access to the upset 38 of the male member 30 once the male member 30 has been fully and properly inserted into the connector body 12. The alignment tab 148 in conjunction with the alignment slot 120 assures that the arms 124 and 142 are always rotationally oriented to allow the pull tab verifier 32 to have access to the upset 38.

With the primary retainer 26 and the secondary retainer 28 inserted into the bore 50 of the stem 16, the cap 16 and the stem 14 are assembled together by inserting the annular rib 78 of the stem 14 into the annular groove 110 of the cap 16. In this assembled positioned, the primary retainer 26 and the secondary retainer 28 are sandwiched in between the forward facing annular abutment surface 57 of the stem 14 and the rearward facing annular abutment surface 103 of the cap 16. The cap 16 is then permanently secured to the stem 14 by spin welding the cap 16 to the stem 14 to form the connector body 12. Once the cap 16 is permanently secured to the stem 14, the bores 50 and 90 collectively define the bore of the connector body 12 and the entrance 94 of the cap 16 defines the entrance of the connector body 12.

By forming the connector body 12 from two separate pieces and permanently securing the two pieces together after positioning a retainer in between the two pieces, a retainer which would otherwise not be able to fit through the entrance 94 of the connector body 12 is able to be positioned within the bore of the connector body 12 and in between two opposing facing annular abutment surfaces 57 and 103. This feature is particularly beneficial since the non-flexible rings 122 and 140 of the primary and secondary retainers 26 and 28 have diameters greater than the diameter of the entrance 94 of the connector body 12.

Another benefit of the arrangement of the connector body 12 of the present invention is that even though it is formed from two separate pieces, the location of where the pieces are joined together is not at the bore or fluid path of the connector body 12. Rather the annular rib 78 of the stem and the annular groove 110 of the cap are located radially outward of their respective bores 50 and 90 and likewise the bore of the connector body 12. By locating the annular rib 78 and the annular groove 110 radially outward of the fluid path, leakage through the joint of the stem and cap is greatly reduced.

It should be noted that while the completed connector body 12 is permanently secured by inserting the annular rib 78 of the stem 14 into the corresponding annular groove 110 of the cap 16 and then spin welding the cap 16 to the stem 14, it remains within the spirit of the present invention to form the rim and annular rib on the cap and form the annular groove on the stem. For such an alternative cap and stem design, the annular rib of the cap is inserted into the corresponding annular groove of the stem and spin welding the stem to the cap.

Furthermore, while the primary retainer 26 and the secondary retainer 28 of the illustrated embodiment are inserted into the bore 90 of the cap 16 so that the retainers 26 and 28 are positioned in between the stem 14 and the annular abutment surface 103 of the cap 16 upon assembling the two components, other arrangements can be used to position the retainer(s) in between the stem 14 and the cap 16, such as inserting the primary retainer and/or the secondary retainer into the bore of an alternative axially elongated stem. It should also be noted that while the primary and secondary retainers 26 and 28 are positioned in between the stem 14 and the annular abutment surface 103 of the cap 16 upon assembling the two components, other types of retainers instead of retainers 26 and 28 can be positioned in between the stem 14 and the annular abutment surface 103 of the cap 16 and still fall within the spirit of the present invention. For instance, a retainer such as the one piece metal retainer disclosed in common assigned U.S. Pat. No. 5,257,833 can be positioned in between the stem 14 and the annular abutment surface 103 of the cap 16 upon assembling the two components.

Once the cap has been permanently secured to the stem, a pull tab verifier 32 can be installed onto the connector body 12 by positioning the legs 33 of the pull verifier into the top and bottom slots 104 and 106. The coupling 10 is then completed by inserting the male member 30 through the entrance 94 of the cap 16 and into the bores 50 and 90 of the stem 14 and the cap 16. As the male member 30 is inserted axially rearward into the bores 50 and 90, the cylindrical sealing surface 44 of the male member 30 passes through an opening defined in the ring 140 and cylindrical sleeve 146 of the secondary retainer 28.

Resistance to further axially rearward insertion of the male member 30 is met upon the upset 38 contacting the arms 124 of the primary retainer 26 and the arms 142 of the secondary retainer 28. Further axially rearward insertion of the male member 30 flexes the arms 124 and 142 of the primary and secondary retainers 26 and 28 radially outward until the upset 38 surpasses the ledges 134 and 144 of the primary and secondary retainers 26 and 28. The arms 124 and 142 of the primary and secondary retainers 26 and 28 then snap radially inward to a locking position wherein the ledges 134 and 144 of primary and secondary retainers 26 and 28 are in abutting relationship with the radial abutment surface 40 of the upset 38 preventing the male member 30 from withdrawing axially forward from the connector body 12.

At the same time, the upset 38 of the male member 30 spreads the legs 33 of the pull tab verifier 32 outwardly allowing the pull tab verifier 32 to be disengaged in the manner disclosed in U.S. Ser. No. 11/440,753 to provide a visual verification that the male member 30 has been fully and properly inserted into the connector body 12.

Various features of the present invention have been explained with reference to the embodiments shown and described. It must be understood that numerous modifications may be made without departing from the spirit and scope of the invention as defined by the appended claims.

The invention claimed is:

1. A quick connector coupling comprising:
a connector body defining a through bore extending axially rearward from an entrance; said body having a lip defining a rearward facing annular abutment surface;
a tube received within said bore with a radially enlarged upset;
a primary retainer disposed in said bore having a primary retainer ring and two primary retainer arms located axially forward of said primary retainer ring, each of said primary retainer arms in abutting relationship with said upset; and
a secondary retainer disposed in said bore having a secondary retainer ring in abutting relation to said rearward facing annular abutment surface of said lip of said connector body and two secondary retainer arms located axially rearward of said secondary retainer ring, each of said secondary retainer arms located circumferentially in between two primary retainer arms and in abutting relationship with said upset.

2. The quick connector coupling as claimed in claim 1 wherein each of said primary retainer arms includes a radially inner section, a radially outer section and a rear bend connecting said radially inner section with said radially outer section, and wherein said radially inner section is in abutting relationship with said upset.

3. The quick connector coupling as claimed in claim 2 wherein said rear bend of each primary retainer arm is adjacent to said secondary retainer ring.

4. The quick connector coupling as claimed in claim 1 wherein said primary retainer further includes a cylindrical sleeve extending axially rearward from said primary retainer ring.

5. The quick connector coupling comprising:
a connector body defining a through bore extending axially rearward from an entrance;
a tube received within said bore with a radially enlarged upset;
a primary retainer disposed in said bore having a primary retainer ring and two primary retainer arms located axially forward of said primary retainer ring, each of said primary retainer arms in abutting relationship with said upset; and
a secondary retainer disposed in said bore having a secondary retainer ring and two secondary retainer arms located axially rearward of said secondary retainer ring, each of said secondary retainer arms located circumferentially in between two primary retainer arms and in abutting relationship with said upset
wherein said connector body defines an alignment slot and said secondary retainer includes an alignment tab extending radially outward from said secondary retainer ring, said alignment tab is positioned in said alignment slot.

6. The quick connector coupling comprising:
a connector body defining a through bore extending axially rearward from an entrance;
a tube received within said bore with a radially enlarged upset;
a primary retainer disposed in said bore having a primary retainer ring and two primary retainer arms located axially forward of said primary retainer ring, each of said primary retainer arms in abutting relationship with said upset; and
a secondary retainer disposed in said bore having a secondary retainer ring and two secondary retainer arms located axially rearward of said secondary retainer ring, each of said secondary retainer arms located circumferentially in between two primary retainer arms and in abutting relationship with said upset
wherein each of said primary retainer arms includes a radially inner section, a radially outer section and a rear bend connecting said radially inner section with said radially outer section, and wherein said radially inner section is in abutting relationship with said upset
wherein each of said radially inner sections includes braces extending circumferentially from each circumferential side of the radially inner section.

7. A quick connector coupling for forming a severable connection in a fluid line including a tube, said coupling comprising a connector body, comprising:
a stem defining an axially extending through bore; and
a separate cap permanently secured to said stem, said cap defining an axially extending through bore;
wherein one of said stem and said cap includes an axially extending annular rib located radially outward of said bore of one of said stem and said cap, other of said stem and said cap includes an annular groove located radially outward of said bore of other of said stem and said cap, said annular rib is positioned in said annular groove;
said connector body defining a though bore extending axially rearward from an entrance; said body having a lip defining a rearward facing annular abutment surface;
a primary retainer disposed in said bore having a primary retainer ring and two primary retainer arms located axially forward of said primary retainer ring, each of said primary retainer arms adapted for an abutting relationship with an upset on the tube; and
a secondary retainer disposed in said bore having a secondary retainer ring and two secondary retainer arms located axially rearward of said secondary retainer ring, in abutting relation to said rearward facing annular abutment surface of said lip of said connector body with each of said secondary retainer arms located circumferentially in between two primary retainer arms and adapted for abutting relationship with the upset on the tube.

8. The quick connector coupling as claimed in claim 7 wherein one of said stem and said cap includes a radially outwardly extending rim, said annular rib extends axially from said rim.

9. The quick connector coupling as claimed in claim 7 wherein said annular rib having a chamfered radially inner surface and a chamfered radially outer surface.

10. The quick connector coupling as claimed in claim 7 further comprising a male member having a radially enlarged upset, said two retainer arms of said primary retainer located axially forward from said retainer ring, each of said retainer arms in abutting relationship with said upset and said two secondary retainer arms in abutting relationship with said upset.

11. The quick connector coupling as claimed in claim 7 wherein said cap defines an axial alignment slot and said secondary retainer includes an alignment tab extending radially outward from said retainer ring, said alignment tab is situated in said alignment slot.

12. The quick connector coupling as claimed in claim 7 wherein said stem and said cap are made from the same material.

13. A quick connector coupling for forming a severable connection in a fluid line comprising:
a connector body including a stem and a separate cap permanently secured to said stem, said connector body defines two annular surfaces and an entrance to a through bore extending axially through said connector body; and
a primary retainer disposed in said bore between said annular surfaces having a primary retainer ring and two primary retainer arms located axially forward of said primary retainer ring,
a secondary retainer disposed in said bore between said annular surfaces having a secondary retainer ring and two secondary retainer arms located axially rearward of said secondary retainer ring, each of said secondary retainer arms located circumferentially in between two primary retainer arms.

14. The quick connector coupling as claimed in claim 13 wherein said cap having a generally cylindrical wall and a lip extending radially inward from said wall, said lip defines one of said annular surfaces.

15. The quick connector coupling as claimed in claim 14 wherein said stem defines a forward facing annular surface defining the other of said annular surfaces.

16. The quick connector coupling as claimed in claim 13 wherein said cap defines an axial alignment slot and said secondary retainer includes a radially outwardly extending alignment tab situated in said alignment slot.

17. The quick connector coupling as claimed in claim 13 wherein said retainer is made from a metallic material.

18. The quick connector coupling as claimed in claim 13 wherein said stem and said cap are made from the same material.

* * * * *